(12) United States Patent
Geismar et al.

(10) Patent No.: US 9,073,792 B2
(45) Date of Patent: Jul. 7, 2015

(54) METHODS FOR IMPROVED ATMOSPHERE CONTROL THROUGH SECONDARY GAS PRESSURE WAVE FIRING

(71) Applicant: CORNING INCORPORATED, Corning, NY (US)

(72) Inventors: Bernd Geismar, Berlin (DE); Thomas Madison Tebo, III, Horseheads, NY (US); Christopher Steven Witte, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 275 days.

(21) Appl. No.: 13/675,288

(22) Filed: Nov. 13, 2012

(65) Prior Publication Data
US 2014/0131926 A1    May 15, 2014

(51) Int. Cl.
| | | |
|---|---|---|
| C04B 33/32 | (2006.01) | |
| C04B 40/02 | (2006.01) | |
| F27B 17/00 | (2006.01) | |
| F27D 7/00 | (2006.01) | |
| F27D 19/00 | (2006.01) | |
| F27D 21/00 | (2006.01) | |
| B28B 11/24 | (2006.01) | |

(52) U.S. Cl.
CPC ............. *C04B 40/0268* (2013.01); *C04B 33/32* (2013.01); *F27B 17/0083* (2013.01); *F27D 7/00* (2013.01); *F27D 19/00* (2013.01); *F27D 21/00* (2013.01); *B28B 11/241* (2013.01); *B28B 11/243* (2013.01)

(58) Field of Classification Search
CPC .............................................. C04B 2235/6586
USPC ......................................................... 264/667
See application file for complete search history.

(56) References Cited

U.S. PATENT DOCUMENTS

| | | | | |
|---|---|---|---|---|
| 2,428,169 | A | * | 9/1947 | Mankin ......................... 264/677 |
| 3,464,682 | A | * | 9/1969 | Remmey ......................... 432/34 |
| 4,069,010 | A | * | 1/1978 | Fay ............................... 432/137 |

(Continued)

FOREIGN PATENT DOCUMENTS

| | | |
|---|---|---|
| AT | 412 086 | 9/2004 |
| EP | 0 709 638 | 1/1996 |
| GB | 1 213 369 | 11/1970 |

OTHER PUBLICATIONS

Patent Cooperation Treaty International Notification of Transmittal of the International Search Report and The Written Opinion of the International Searching Authority, international application No. PCT/US2013/069066; mailing date May 30, 2014, 9 pages.

*Primary Examiner* — Joseph S. Del Sole
*Assistant Examiner* — Russell Kemmerle, III
(74) *Attorney, Agent, or Firm* — Joseph M. Homa; Matthew B. McNutt

(57) ABSTRACT

Methods of firing ware in a furnace. At least one stack of ware is positioned in a ware space of a furnace. The stack of ware comprises a plurality of ware articles arranged such that at least laterally adjacent ware articles are spaced apart. The at least one stack of ware is heated in the ware space of the furnace. At least one gas is introduced into the ware space on a first side of the at least one stack of ware as the stack is heated. A flow condition of the at least one gas is adjusted to create a pressure differential within the furnace across at least a portion of the ware space such that at least some of the at least one gas flows through the at least one stack of ware.

16 Claims, 9 Drawing Sheets

(56) References Cited

U.S. PATENT DOCUMENTS

| | | | |
|---|---|---|---|
| 4,482,314 A * | 11/1984 | Giese et al. | 432/11 |
| 4,927,577 A * | 5/1990 | Ohtaka et al. | 264/630 |
| 5,316,710 A * | 5/1994 | Tasaki et al. | 264/630 |
| 6,048,199 A | 4/2000 | Dull et al. | 432/128 |
| 6,099,793 A | 8/2000 | Dull et al. | 264/631 |
| 6,287,509 B1 | 9/2001 | Gheorghiu | 264/630 |
| 6,325,963 B1 * | 12/2001 | Dull et al. | 264/631 |
| 2005/0056974 A1 * | 3/2005 | Suzuki et al. | 264/605 |
| 2007/0054229 A1 * | 3/2007 | Hanzawa et al. | 432/266 |
| 2008/0116621 A1 * | 5/2008 | Brennan et al. | 264/606 |
| 2011/0127699 A1 * | 6/2011 | Vayansky et al. | 264/630 |

\* cited by examiner

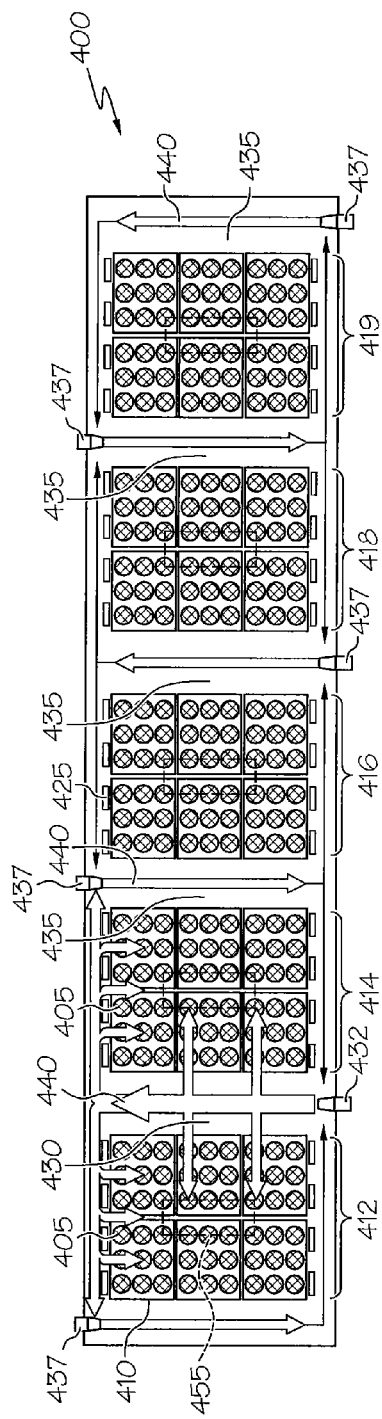
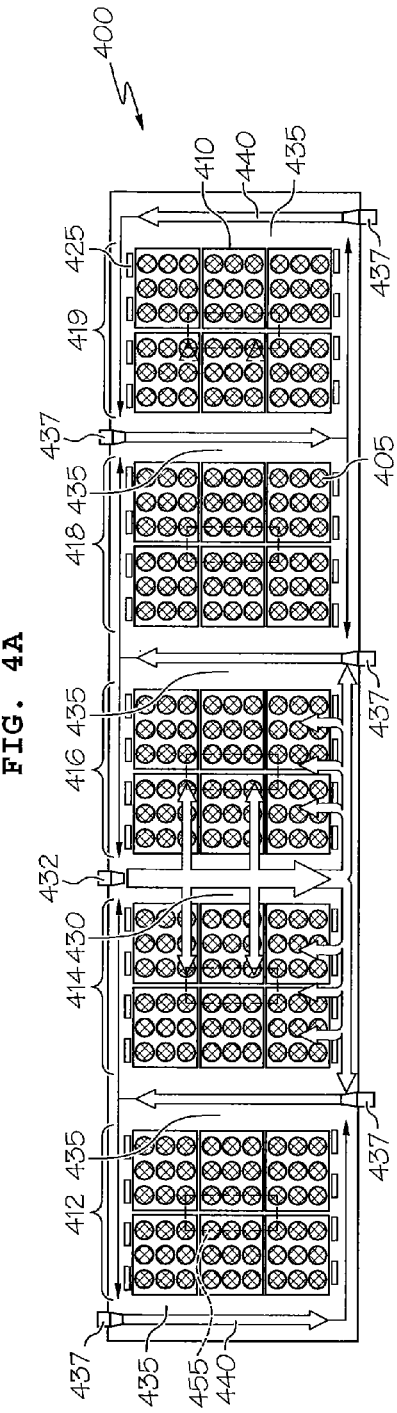
FIG. 4A
FIG. 4B

METHODS FOR IMPROVED ATMOSPHERE CONTROL THROUGH SECONDARY GAS PRESSURE WAVE FIRING

BACKGROUND

1. Field

The present specification relates to methods for firing ware in a furnace and, more particularly, to methods for controlling a furnace atmosphere during firing of ware.

2. Technical Background

Ceramic ware is often heated or "fired" in a kiln or furnace. If the ware is not properly fired, it can crack or otherwise fail to form correctly. One problem associated with improper firing is uneven heating, such as when there are temperature differences between each piece of ware. This can occur from introducing heated gas into a heating space of a furnace or kiln in which some pieces of ware are positioned close to the entrance of the heated gas and other pieces of ware are positioned in the inner portions of the heating space further away from where the heated gas enters. The kiln can have regions in the heating space at higher temperatures resulting in overheating of the ware, and regions at lower temperatures resulting in underheating of the ware. Excessive overheating can cause ware to crack. Excessive underheating can adversely affect the final desired properties of the formed ware. Thus, it may be desirable to have a more uniform and controlled temperature distribution throughout the heating space of a kiln during firing.

Another problem associated with improper firing is temperature differentials within each piece of ware. Ware containing organic compounds that are removed (via burning) by oxidation and/or combustion during the firing cycle tend to produce large amounts of exothermic heat. The exothermic heat can produce a temperature differential within each piece of ware. In addition, oxygen present in the atmosphere tends to react with the organic compounds thereby accelerating release and increasing the exothermic reaction. Large temperature differentials within ware can cause cracking. Thus, it may be desirable to minimize the temperature differential and cracking within each ware.

Accordingly, alternative methods for providing atmosphere control during firing cycles to produce crack-free ware are needed.

SUMMARY

According to one embodiment, methods for firing ware in a furnace may include positioning at least one stack of ware in a ware space of a furnace, the stack of ware comprising a plurality of ware articles arranged such that at least laterally adjacent ware articles are spaced apart; heating the at least one stack of ware in the ware space of the furnace; introducing at least one gas into the ware space on a first side of the at least one stack of ware as the stack is heated; and adjusting a flow condition of the at least one gas to create a pressure differential within the furnace across at least a portion of the ware space such that at least some of the at least one gas flows through the at least one stack of ware.

In another embodiment, methods of firing ware in a kiln may include positioning at least one stack of ware in a ware space of a kiln, the stack of ware comprising a plurality of ware articles arranged such that at least laterally adjacent ware articles are spaced apart; heating the at least one stack of ware in the ware space of the kiln; introducing at least one gas into the ware space on a first side of the at least one stack of ware at a first flow rate FR1 as the stack is heated; and adjusting the first flow rate FR1 of the at least one gas to create a pressure differential across at least a portion of the at least one stack of ware such that at least some of the at least one gas flows through the at least one stack of ware.

In a further embodiment, methods for firing ware in a kiln may include positioning at least one stack of ware in a ware space of a kiln, the stack of ware comprising a plurality of ware articles arranged such that at least laterally adjacent ware articles are spaced apart; heating the at least one stack of ware in the ware space of the kiln; introducing at least one gas into the ware space on a first side of the at least one stack of ware at a first flow rate FR1 as the stack is heated; introducing the at least one gas into the ware space on a second side of the at least one stack of ware at a second flow rate FR2 as the stack is heated; and adjusting the first flow rate FR1 to create a pressure differential across at least a portion of the at least one stack of ware such that FR1≠FR2 and at least some of the at least one gas flows through the at least one stack of ware.

Additional features and advantages of the methods described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter. Whenever possible, the same reference numerals will be used throughout the drawings to refer to the same or like parts.

BRIEF DESCRIPTION OF THE DRAWINGS

FIG. 4A graphically depicts a top view of at least a portion of an at least one gas flowing through two or more stacks of ware in a furnace at time, $t_0$, according to one or more embodiments shown and described herein.

FIG. 4B graphically depicts a top view of at least a portion of the at least one gas flowing through the two or more stacks of ware in the furnace of FIG. 4A at time, $t_{0+n}$, according to one or more embodiments shown and described herein.

DETAILED DESCRIPTION

Reference will now be made in detail to improved methods for firing ware, embodiments of which are illustrated in the figures, starting at FIGS. 2A & 2B.

Figure 1A:
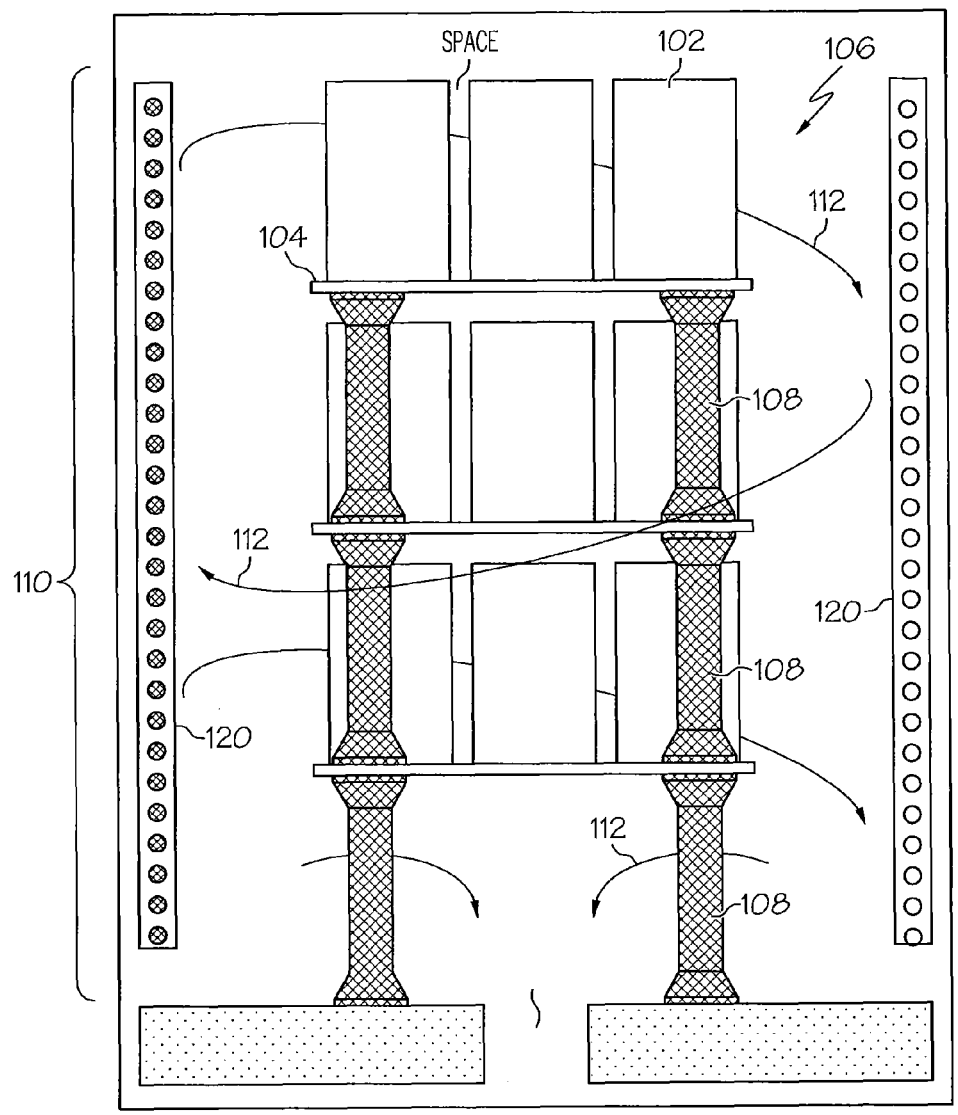
FIG. 1A graphically depicts a side view of at least one gas flowing around a stack of ware in a furnace.
Figure 1B:
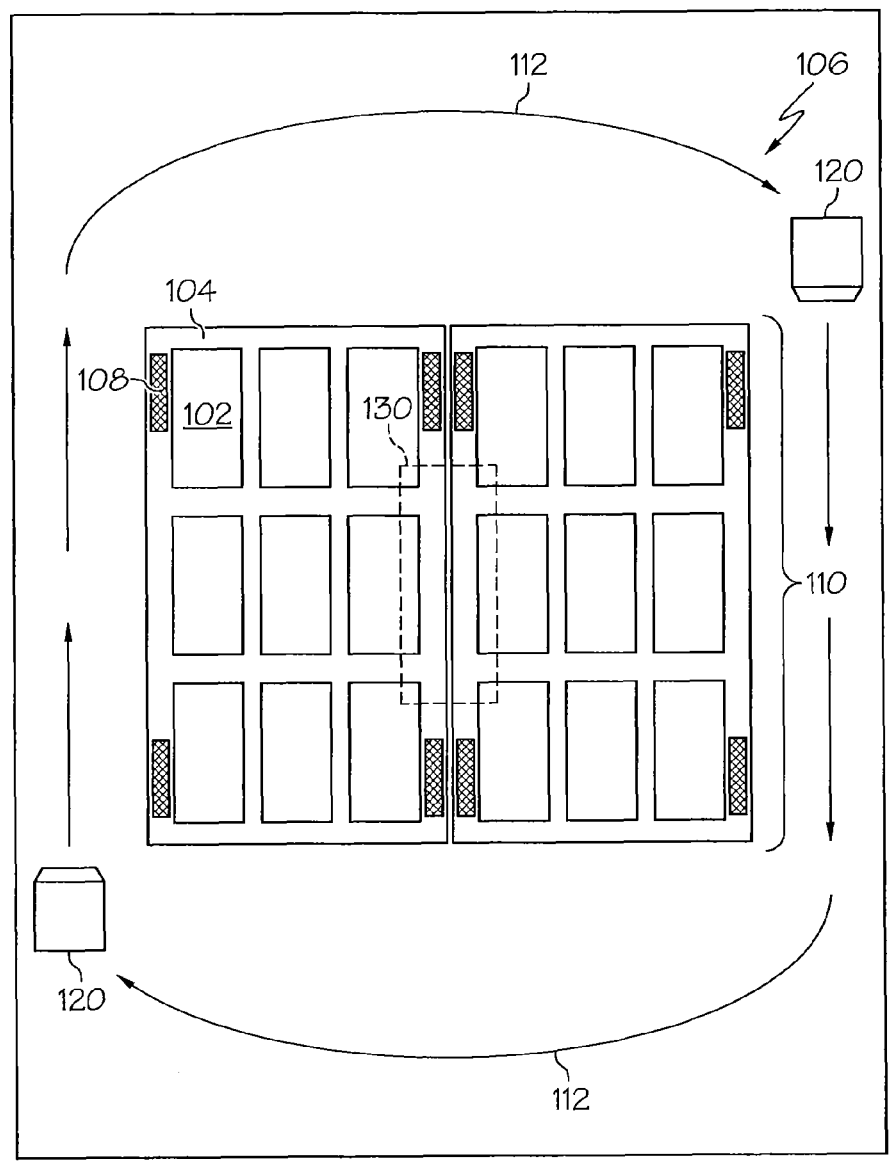
FIG. 1B graphically depicts a top view of at least one gas flowing around the stack of ware in a furnace of FIG. 1A.

FIGS. 1A & 1B depict a conventional technique for minimizing a temperature and heating differential within pieces of ceramic ware within a ware space of a kiln, and providing a uniform atmosphere in a ware space. Referring to FIG. 1A, ware articles (102) are depicted loaded onto setters (104) within a furnace ware space (106) with lateral and vertical spacing between each ware article (102). As used herein, "ware" and "ware article" can include ceramic articles, including ceramic honeycomb filters, and other articles that are commonly fired or heated, such as technical ceramics, sanitary ware, and structure ceramics. The particular desired size and shape of the ware article may depend on the application. It should be further understood that "heating space" and "ware space" can be used interchangeably and refer to the area within a furnace or kiln where ware is placed to be heated or fired.

The ware article (102) is stacked on setters that are supported by posts (108) to form a stack of ware (110). FIG. 1B further shows the stack of ware (110) arranged within the ware space (106) between fire lanes (120) extending across a portion of the ware space (106). Each firelane (120) evenly introduces heated gas into the ware space (106). The circulation of heated gas is shown by the arrows in FIGS. 1A & 1B. Due to the even introduction of heated gas (112) into the ware space (106), the heated gas has a downward flow that encircles the stack of ware (110). The heated gas (112) exits the ware space through a flue opening (130).

Problems associated with the conventional technique is that the heated gas enters the ware space and encircles the stack of ware with little heated gas passing through the spaces between each ware article. Poor circulation of the heated gas into these spaces can result in varied temperature distributions between each ware article as some ware receives more heat from the burners than others do. In addition, poor circulation of the heated gas can result in less exothermic heat removal during the portion of the firing cycle where organic components present in the ware is removed (via burning). The result is a large temperature differential within each ware article that can ultimately lead to cracking. Lastly, poor circulation of the heated gas can result in inconsistent oxygen levels present throughout the ware space, and in turn, some ware in the kiln may experience an increased exothermic reaction where higher oxygen levels are present than other ware.

In one embodiment, a method of firing ware includes positioning at least one ware article in a ware space of a kiln; heating the at least one ware; introducing at least one gas into the ware space on a first side of the at least one ware article to create a pressure differential across the at least one ware article such that at least some of the at least one gas flows through the at least one stack of ware. Various methods of firing ware will be described herein with specific reference to the appended drawings.

Figure 2A:
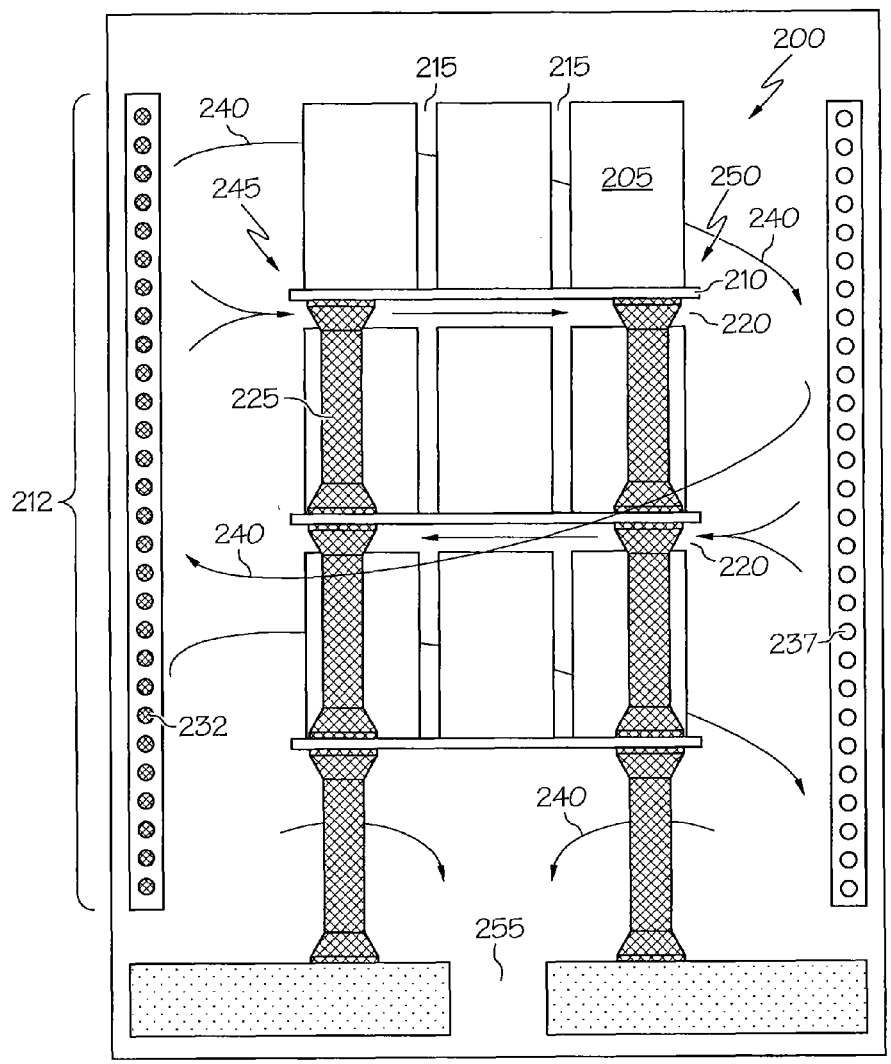
FIG. 2A graphically depicts a side view of at least a portion of an at least one gas flowing through at least one stack of ware in a furnace according to one or more embodiments shown and described herein.

Referring now to FIG. 2A, a method for firing ware according to the present specification is depicted. In this method, a plurality of ware articles (205) are positioned onto setters (210) within a furnace ware space (200) to form at least one stack of ware (212). The plurality of ware articles (205) are arranged such that at least laterally adjacent ware articles are spaced apart (215). The plurality of ware articles (205) may be further arranged such that the plurality of ware articles (205) are vertically spaced apart (220). The setters (210) may be supported by posts (225) to separate each level of ware articles (205). The setters (210) may be provided with one or more through-holes to allow for better heat distribution or through-level ventilation. Alternatively, the setters (210) may be solid. In the embodiment shown in FIG. 2A, the setters (210) are depicted as being rectangular; however, other suitable shapes may be used and can include, for example, setters that are oval, circular, square, etc.

Figure 2B:
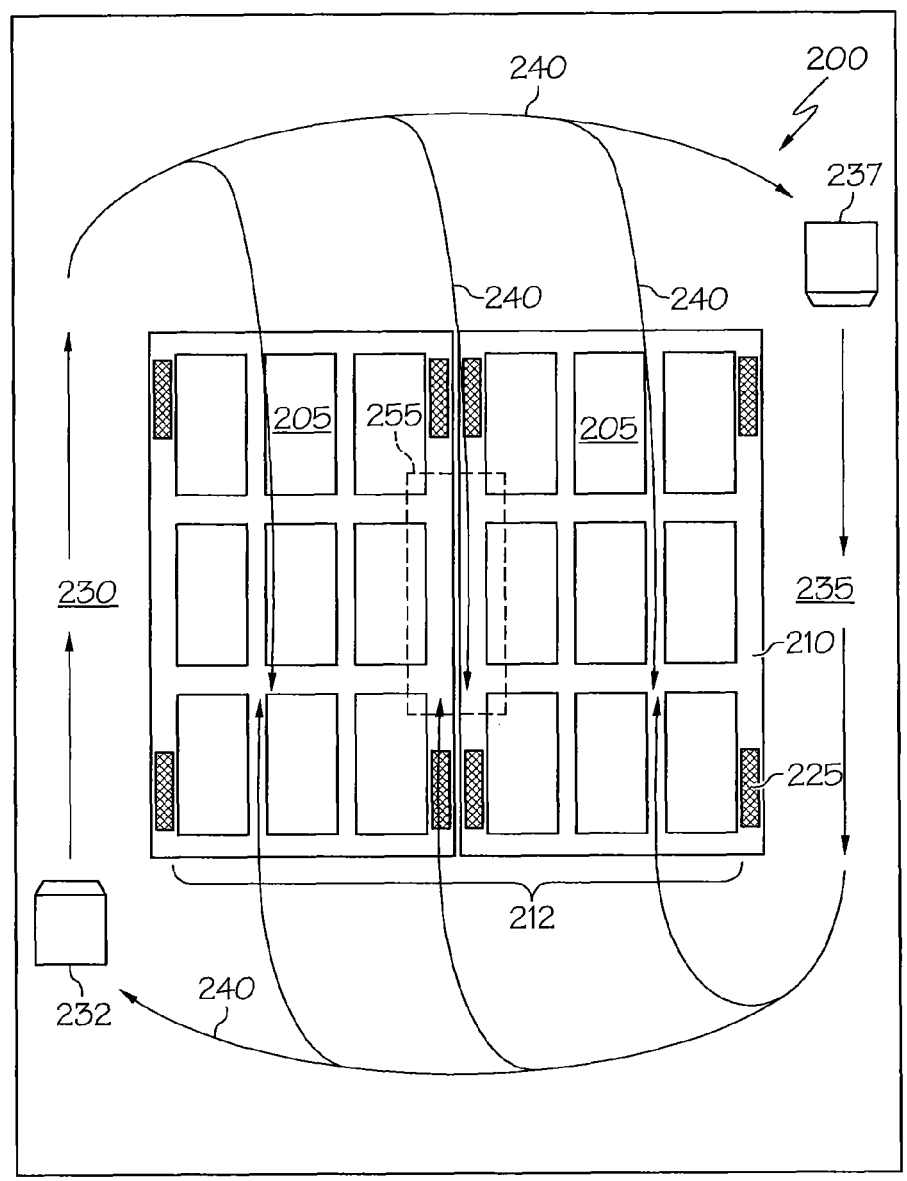
FIG. 2B graphically depicts a top view of at least a portion of the at least one gas flowing through the at least one stack of ware in the furnace of FIG. 2A according to one or more embodiments shown and described herein.

FIG. 2B further depicts a top view of the plurality of ware articles (205) that form at least one ware stack (212). The ware articles (205) are generally positioned in a grid pattern. However, it should be understood that the plurality of ware articles (205) may be positioned in a linear pattern, circular pattern or a simply random pattern. In the embodiment shown in FIG. 2B, the at least one stack of ware (212) has nine ware articles on its top level. Of course, any suitable number of ware articles may be positioned on each level, with each level having the same or different numbers of ware articles. It should also be understood the ware articles (205) may be positioned such that each level has the same or different ware article configuration. Further, the furnace ware space (200) may have any suitable number of at least one stack of ware (212) present, and can include two or more stacks of ware.

The at least one stack of ware (212) is arranged such that a first firelane (230) is positioned on a first side (245) of the stack and a second firelane (235) is positioned on a second side (250) of the stack. Firelanes are generally positioned throughout the ware space (200) where more than one stack of ware is present as further described below. The firelanes (230, 235) comprise a plurality of burners (232, 237) that introduce at least one gas (240) into the furnace ware space (200). In some embodiments, the first firelane burners (232) and the second firelane burners (237) introduce the at least one gas into its respective firelane in an opposing direction and perpendicular to the stack of ware. In other embodiments, the first firelane burners (232) and the second firelane burners (237) introduce at least one gas into its respective firelane in a same direction and perpendicular to the stack of ware. The plurality of burners (232, 237) in each firelane may be arranged adjacent to each other firing at different elevations with the furnace. In some examples, the plurality of burners (232, 237) may be disposed near the top of the furnace, and at a height above the at least one stack of ware. However, it should be understood that in some embodiments, the plurality of burners may be disposed at other parts of the furnace, including, for example, the middle portion of the furnace, the bottom portion of the furnace, etc. The plurality of burners (232, 237) in each firelane may fire in the same direction within one firelane, or in opposing directions within one firelane.

The burners (232, 237) may burn a primary gas, or fuel oil, to produce a heated combustion gas that is directed into the ware space of the furnace, but not directly at a stack of ware or the supporting furniture, including the setters and posts. The burners (232, 237) may also supply an excess secondary gas to assist in directing the heated gas into the ware space of the furnace, or this secondary gas may be input directly from dedicated non-combustion nozzles or openings. The at least one gas from the first firelane (230) and the second firelane (235) may be the same or different. In some embodiments, the at least one gas is a secondary gas comprising one or more of: low oxygen gas, nitrogen, air, carbon dioxide, carbon monoxide, or water vapor. In other embodiments, the at least one gas comprises a primary gas and a secondary gas. The primary gas may typically be a fuel gas and includes one or more of oxygen, air, methane, or other combinations of hydrocarbon fuels, oxidizers, and their combustion byproducts. Common hydrocarbon fuels, may include but are not limited to, acetylene, butane, natural gas, producer gas, and/or propane. The secondary gas is typically an inert gas that may further include small amounts of fuel gas and other components that typically result from combustion (for example, carbon monoxide, carbon dioxide, water vapor, etc.). The secondary gas comprises one or more of low oxygen gas, nitrogen, air, carbon dioxide, carbon monoxide, or water vapor. In further embodiments, the at least one gas is a primary gas comprising one or more of oxygen, air, methane, or other combinations of hydrocarbon fuels, oxidizers, and their combustion byproducts. Common hydrocarbon fuels, may include but are not limited to, acetylene, butane, natural gas, producer gas, and/or propane.

The furnace depicted in FIGS. 2A & 2B is a downdraft kiln. However, it should be understood that the method described herein may also be used with other types of kilns, including, but not limited to, top draft kilns, side-draft kilns, microwave furnaces, gas-fired furnaces, radiative heating furnaces, or electric kilns.

Still referring to FIGS. 2A & 2B, the at least one stack of ware (212) in the ware space (200) may be heated or fired according to a firing cycle necessary to appropriately fire the ware. At least one gas (240) is introduced into the ware space (200) on a first side (245) of the at least one stack of ware (212) as the stack is heated. The circulation of gas is shown by the arrows in FIGS. 2A & 2B. A flow condition of the at least one gas (240) is adjusted to create a pressure differential within the furnace across at least a portion of the ware space (200) such that at least some of the at least one gas flows through the at least one stack of ware (212).

In some embodiments, the at least one gas (240) is introduced into the ware space (200) on a first side (245) of the at least one stack of ware (212) at a first flow rate FR1. Adjusting a flow condition may include adjusting the first flow rate FR1 of the at least one gas (240) to create a pressure differential across at least a portion of the at least one stack of ware (212) such that at least some of the at least one gas flows (240) through the at least one stack of ware (212) instead of primarily around the stack of ware, as in conventional firing methods. In other embodiments, the at least one gas (240) is introduced into the ware space (200) on a first side (245) of the at least one stack of ware (212) at a first flow rate FR1 as the stack is heated. The at least one gas (240) is also introduced into the ware space (200) on a second side (250) of the at least one stack of ware (212) at a second flow rate FR2 as the stack is heated. Adjusting a flow condition may include adjusting the first flow rate FR1 to create a pressure differential across at least a portion of the at least one stack of ware (212) such that FR1≠FR2, and at least some of the at least one gas (240) flows through the at least one stack of ware (212). As noted above, the at least one gas introduced from the burners of the first firelane (230) and second firelane (235) may be the same or different.

Without being bound by theory, it is believed that creating a pressure differential across the ware space by wave firing allows increased gas flow through the space between each ware article. In addition, it is also believed that the increased gas flow through the space between each ware article can result in a reduced overall gas amount required to fire ware within the kiln. The increased gas flow may reduce heating differentials between each ware article as more of the heated gas reaches the ware articles located furthest away from the burners. Additionally, a more uniform temperature distribution within the kiln ware space is achieved, which avoids excessive overheating and underheating the stack of ware. Thus, minimizing the heat differential between each ware article may reduce cracking and improve graphite removal. It is also believed that temperature differentials within each ware article are reduced because more consistent oxygen levels are present in the ware space and larger amounts of exothermic heat are removed from each ware article. As gas flow is increased through the space between each ware article, the amount of oxygen-containing gas is more evenly distributed to each ware article. In addition, increased gas flow through the space between each ware article allows for improved exothermic heat removal. Thus, minimizing the temperature differential within each ware article reduces cracking.

Where a high density of ware articles are loaded in a kiln ware space, dimensional distortion can result in each ware article due to the exothermic nature of organic compound removal, particularly between the core and skin region of each ware article. Thus, wave firing can improve dimensional uniformity in high density loading conditions. In addition, it is believed that graphite removal may be improved through wave firing. Graphite can cause significant temperature differentials between the core and skin. Thus, graphite removal may be improved through more efficient heating of each ware article by reducing temperature differentials. Improved graphite removal can result in improved porosity, and reduced disruption of the microstructure due to thermal expansion when too much graphite is present.

In some embodiments, a pressure differential may be created by only introducing the gas into the ware space (200) from the first firelane (230) on a first side of the stack (212, 214) at a first flow rate FR1, without introducing gas into the ware space from a second firelane (235) on a second side of the stack. In other embodiments, a pressure differential may be created by introducing a gas comprising a primary and secondary gas into the ware space from the first firelane (230) on a first side of the stack at a first flow rate FR1, and introducing only a primary gas into the ware space from a second firelane (235) to provide heat to the ware space on a second side of the stack at a second flow rate FR2 that is less than the first flow rate FR1. In further embodiments, a pressure differential may be created by introducing at least one gas into the ware space from the first-firelane (230) on a first side of the stack at a first flow rate FR1, and introducing the at least one gas into the ware space on a second side of the at least one stack of ware at a second flow rate FR2, wherein FR1≠FR2. In some embodiments, FR1≠FR2, FR1≠0, and FR2≠0. In other embodiments, FR1≠FR2, and one of FR1 or FR2=0.

Figure 3A:
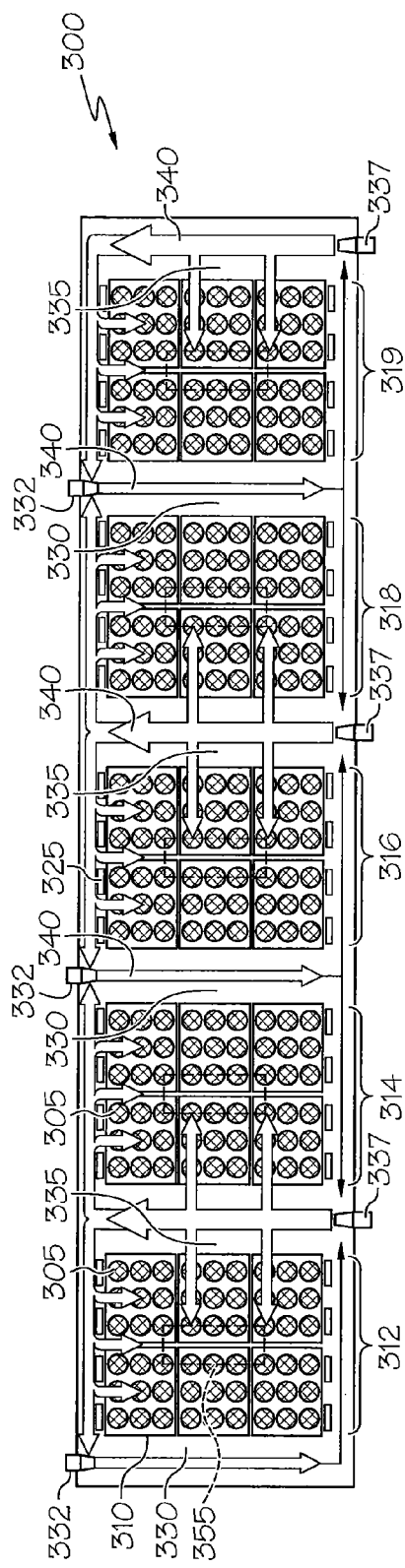
FIG. 3A graphically depicts a top view of at least a portion of an at least one gas flowing through two or more stacks of ware in a furnace at time, $t_0$, according to one or more embodiments shown and described herein.
Figure 3B:
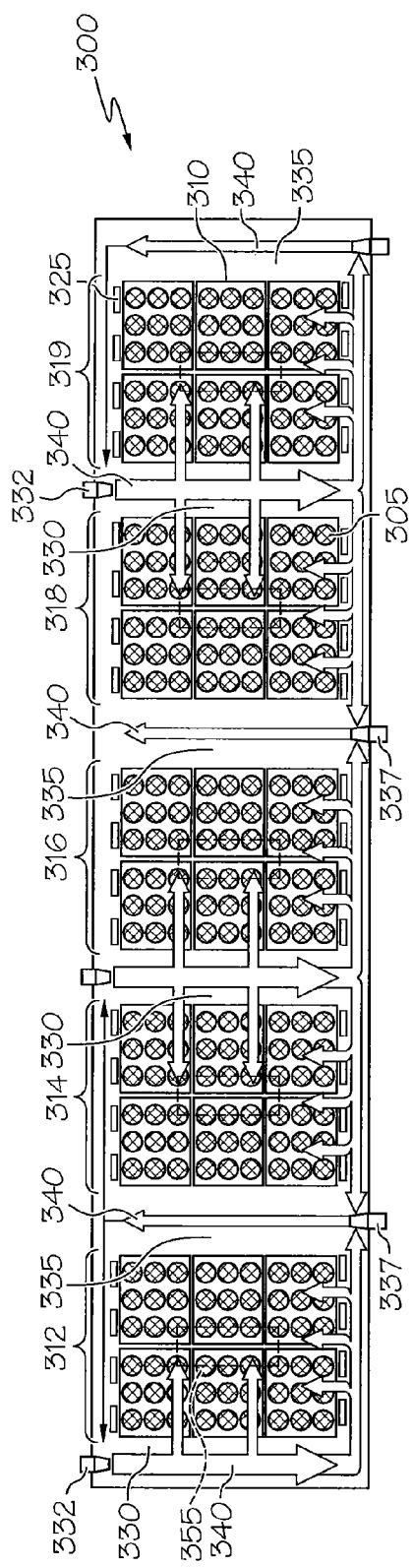
FIG. 3B graphically depicts a top view of at least a portion of the at least one gas flowing through the two or more stacks of ware in the furnace of FIG. 3A at time, $t_{0+n}$, according to one or more embodiments shown and described herein.

In some embodiments, multiple firelanes (for example, three or more firelanes) are present with at least one stack of ware positioned adjacent to each firelane. Referring to FIGS. 3A & 3B, a method for firing ware according to the present specification is depicted. In this method, a plurality of ware articles (305) are positioned onto setters (310) within a furnace ware space (300) to form at least one stack of ware (312, 314, 316, 318, 319). The plurality of ware articles (305) are arranged such that at least laterally adjacent ware articles are spaced apart. The plurality of ware articles (305) may be further arranged such that the plurality of ware articles (305) are vertically spaced apart. The setters (310) may be supported by posts (325) to separate each level of ware articles (305).

Figure 3C:
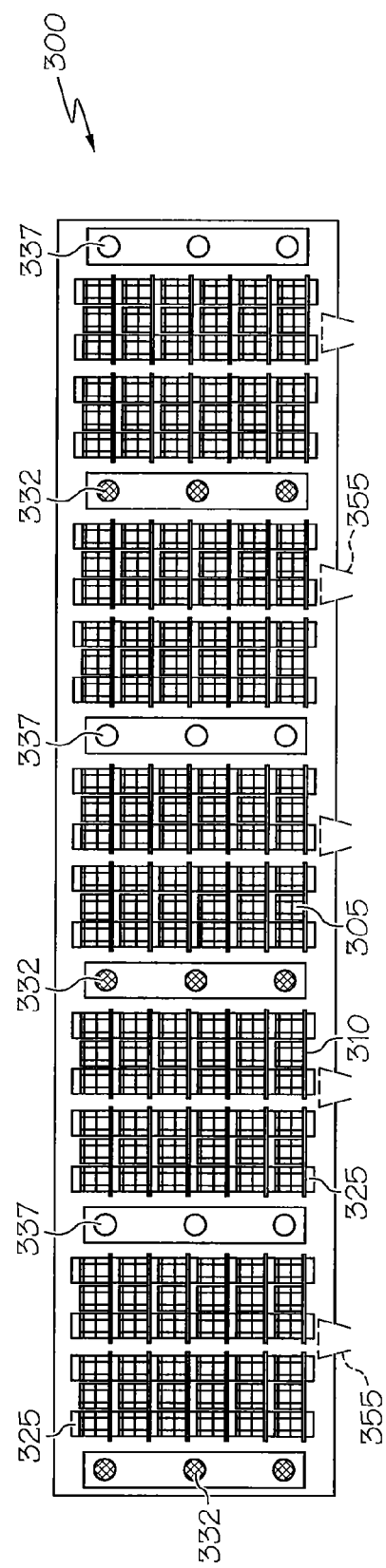
FIG. 3C graphically depicts a side view of at least a portion of an at least one gas flowing through the two or more stacks of ware in the furnace of FIG. 3A according to one or more embodiments shown and described herein.

FIG. 3C further depicts a side view of the plurality of ware articles (305) in individual ware stacks (312, 314, 316, 318, 319). The stacks of ware (312, 314, 316, 318, 319) are arranged such that laterally adjacent stacks of ware are spaced apart. One or more first firelanes (330) and one or more second firelanes (335) are positioned between the stacks in an alternating manner. The firelanes (330, 335) comprise a plurality of burners (332, 337) that introduce at least one gas (340) into the furnace ware space (300). The one or more first firelane burners (332) and the one or more neighboring second firelane burners (337) introduce the at least one gas into its respective firelane in an opposing direction and perpendicular to the stack of ware. However, it should be understood that in some embodiments, the one or more first firelane burners (332) and the one or more neighboring second firelane burners (337) may introduce the at least one gas into its respective firelane in a same direction and perpendicular to the stack of ware.

Referring to FIG. 3A, at time $t_0$, at least one gas (340) is introduced into the ware space (300) into the one or more first firelanes (330) at a first flow rate FR1 as the stacks are heated. The at least one gas (340) is also introduced into the ware space (300) into the one or more second firelanes (335) at a second flow rate FR2 as the stacks are heated. The first flow rate FR1 and second flow rate FR2 are such that FR1>FR2 and a pressure differential is created within the furnace across at least a portion of each stack of ware (312, 314, 316, 318, 319). Referring to FIG. 3B, at time $t_{0+n}$, a flow condition of the at least one gas is adjusted such that FR1<FR2. Thus, a staggered pressure differential effect is achieved in that each stack of ware (312, 314, 316, 318, 319) may experience a pressure differential separate and independent from another stack of ware. In some embodiments, FR1>FR2, FR1≠0, and FR2≠0. In some embodiments, FR1<FR2, FR1≠0, and FR2≠0. In other embodiments, FR1>FR2, and one of FR1 or FR2=0. In other embodiments, FR1<FR2, and one of FR1 or FR2=0.

Referring to FIGS. 4A & 4B, a method for firing ware according to the present specification is depicted. In this method, a plurality of ware articles (405) are positioned onto setters (410) within a furnace ware space (400) to form at least one stack of ware (412, 414, 416, 418, 419). The plurality of ware articles (405) are arranged such that at least laterally adjacent ware articles are spaced apart. The plurality of ware articles (405) may be further arranged such that the plurality of ware articles (405) are vertically spaced apart. The setters (410) may be supported by posts (425) to separate each level of ware articles (405).

Figure 4C:
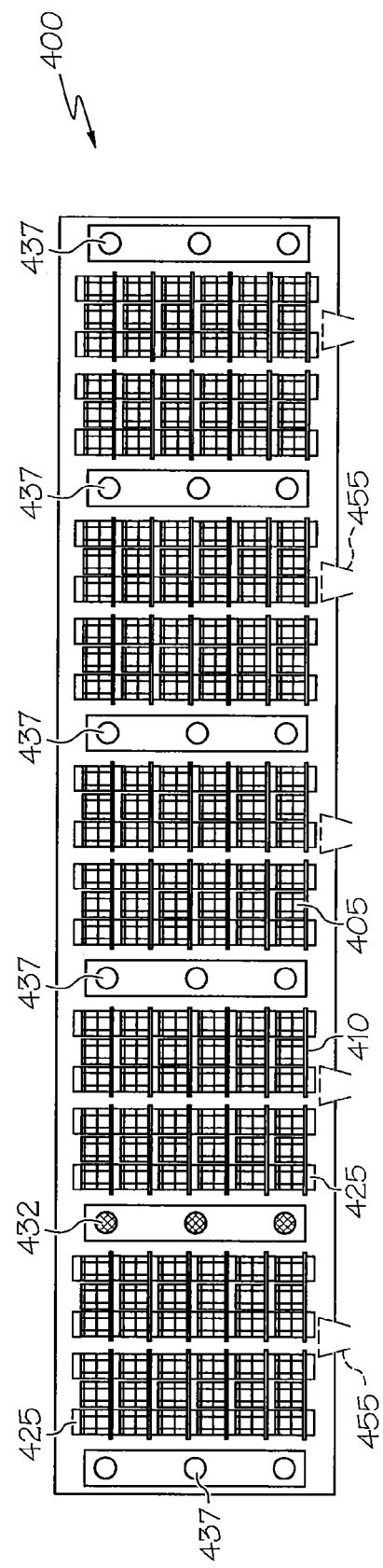
FIG. 4C graphically depicts a side view of at least a portion of an at least one gas flowing through the two or more stacks of ware in the furnace of FIG. 4A according to one or more embodiments shown and described herein.

FIG. 4C further depicts a side view of the plurality of ware articles (405) in individual ware stacks (412, 414, 416, 418, 419). The stacks of ware (412, 414, 416, 418, 419) are arranged such that laterally adjacent stacks of ware are spaced apart. The furnace comprises at least one primary firelanes (430) and at least two secondary firelanes (435). It should be understood that in some embodiments, any number of primary and secondary firelanes may be used. Each firelane (430, 435) comprises a plurality of burners (432, 437) that are positioned between the stacks in an alternating and opposing manner. The plurality of burners (432, 437) introduce at least one gas (440) into the furnace ware space (400) and into each firelane (430, 435) in an opposing direction and perpendicular to the stack of ware. However, it should be understood that in some embodiments, the plurality of burners (432, 437) may introduce the at least one gas in a same direction and perpendicular to the stack of ware.

Referring to FIG. 4A, at time $t_0$, at least one gas (440) is introduced into the ware space (400) into a primary firelane (430) at a first flow rate FR1 as the stacks are heated. The at least one gas (440) is also introduced into the ware space (400) into at least two secondary firelanes (435) at a second flow rate FR2 as the stacks are heated. The first flow rate FR1 and second flow rate FR2 are such that FR1>FR2 and a pressure differential is primarily created within the furnace across at least a portion of each stack of ware (312, 314) adjacent to the primary firelane (430). Referring to FIG. 4B, at time $t_{0+n}$, a flow condition of the at least one gas is adjusted across all firelanes such that a new primary firelane (430) is formed and the previous primary firelane (430) at time $t_0$, is now a secondary firelane (435). In some embodiments, the new primary firelane (430) was previously a secondary firelane adjacent to the primary firelane at time $t_0$. In other embodiments, the new primary firelane (430) at time $t_{0+n}$ was previously a secondary firelane nonadjacent to the primary firelane at time $t_0$. The first flow rate FR1 and second flow rate FR2 are such that FR1>FR2 and a pressure differential is primarily created within the furnace across at least a portion of each stack of ware (314, 316) adjacent to the new primary firelane (430). In some embodiments, FR1>FR2, FR1≠0, and FR2≠0. In other embodiments, FR1>FR2, and one of FR1 or FR2=0. The flow condition of the at least one gas may continually be adjusted across all firelanes such that a single pressure differential within the furnace across the entire ware space is created. That is, each firelane creates a traveling pressure wave across at least a portion of the ware space going from high pressure to low pressure across all of the stacks of ware. In some embodiments, the pressure differential across each stack of ware may be the same. In other embodiments, pressure differential across each stack of ware may be different.

While the pressure differential has been described herein as being created by varying the flow rate of the gas, it should be understood that other methods of creating the pressure differential are also contemplated.

Referring to FIG. 2A, by way of example, the at least one gas is exhausted from the furnace through a vent (255). The furnace may comprise any number of vents to adequately exhaust the at least one gas from the furnace, and can comprise at least one vent. The vent (255) is depicted located under the stack of ware (212). Of course, there may be other vent configurations, which can include, for example, one vent per two stacks of ware, one vent per three or more stacks of ware, or one vent for all stacks of ware present in the furnace.

The vent (255) may be comprise a variable opening such that the opening size of the vent may vary between fully open, fully closed, or partially open during a firing cycle to vary the exhaust flow rate. Accordingly, adjusting a flow condition may additionally or alternatively comprise adjusting the variable opening to reduce or increase the exhaust flow rate, and thus create a pressure differential across at least a portion of the ware space such that at least some of the at least one gas flows through the at least one stack of ware. Referring to FIG. 4C, in some embodiments, a plurality of vents (355) are positioned within the furnace ware space to create a single pressure differential across at least a portion of the ware space going from high pressure to low pressure across all of the at least one stack of ware. Referring to FIG. 3C, in other embodiments, a plurality of vents (355) are located under each of the at least one stack of ware to create a pressure differential within the furnace across at least a portion of each of the at least one stack of ware. Similar to above, in some embodiments, the pressure differential across at least a portion of each of the at least one stack of ware is the same. In other embodiments, the pressure differential across at least a portion of each of the at least one stack of ware is different.

In some embodiments, the flow condition of the at least one gas is adjusted to create a pressure differential across at least a portion of the ware space such that the first flow rate FR1 and the second flow rate FR2 have a percent flow rate differential of from about 10% to about 95%, from about 10% to about 75%, or from about 10% to about 40%.

The percent flow rate differential may be calculated as follows:

$$\% \ D_{fr} = \frac{|FR1| - |FR2|}{\text{greater of } (FR1, FR2)}$$

In some embodiments, the flow condition of the at least one gas is adjusted to create a pressure differential across at least a portion of each of the at least one stack of ware such that the first flow rate FR1 and the second flow rate FR2 have a percent flow differential of from about 10% to about 95%, from about 10% to about 75%, or from about 10% to about 40%. In other embodiments, the first flow rate FR1 of the at least one gas is adjusted to create a pressure differential across at least a portion of the ware space. In other embodiments, the first flow rate FR1 of the at least one gas is adjusted to create a pressure differential across at least a portion of the at least one stack of ware. In further embodiments, the first flow rate FR1 and the second flow rate FR2 are adjusted to create a pressure differential across at least a portion of the ware space such that FR1 and FR2 have a percent flow rate differential of from about 10% to about 95%, from about 10% to about 75%, or from about 10% to about 40%. In further embodiments, the first flow rate FR1 and the second flow rate FR2 are adjusted to create a pressure differential across at least a portion of each of the at least one stack of ware such that FR1 and FR2 have a percent flow rate differential of from about 10% to about 95%, from about 10% to about 75%, or from about 10% to about 40%. In even further embodiments, the variable opening of the vent is adjusted to create a pressure differential across at least a portion of the ware space. And, in even further embodiments, the variable opening of the vent is adjusted to create a pressure differential across at least a portion of the at least one stack of ware.

EXAMPLE

A ceramic batch suitable for the production of ceramic ware was prepared. The ceramic batch contained inorganic and organic compounds. The batch was blended to form a homogeneous batch that was then extruded to form green ceramic honeycomb substrates (i.e., ware articles). The ware articles were dried and then placed into a gas fired kiln. Thermocouples were placed in proximity to the mid-skin of both ware articles in the interior of the load and ware articles loaded near the firelane, prior to firing.

Figure 5:
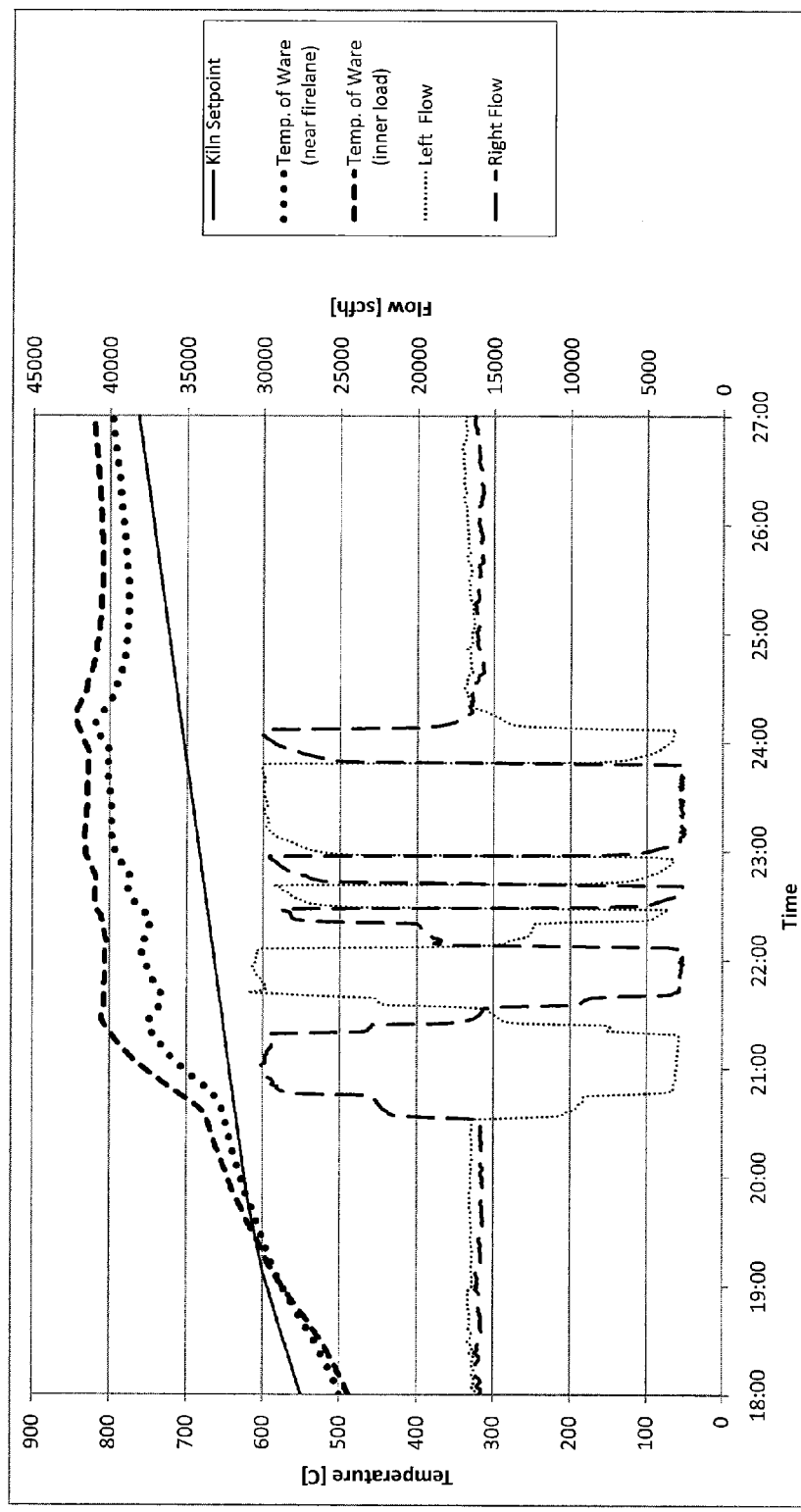
FIG. 5 is a graph illustrating the change in skin temperatures during firing in response to a change in burner flow according to one or more embodiments shown and described herein.

Referring to FIG. 5, a graph of skin temperature changes that occur in ware articles in response to changes in gas flows during a portion of a firing cycle is depicted. The stack of ware comprising a plurality of ware articles was fired in the kiln. Left and right gas flows were introduced into the ware space on opposite sides of the stack from corresponding left and right firelanes. During approximately hours 20 and 25 of the firing cycle, the left and right gas flows were adjusted to create a pressure differential within the furnace across at least a portion of the stack of ware. The temperature of the ware articles both near the firelane and in the interior of the stack of ware exhibited variation in temperatures that corresponded to the variation of the left and right gas flows. It is believed that this variation of temperature of the ware articles is due to increased gas flow (and also increased oxygen flow) within the stack of ware. It should be noted that pressure differentials for effectively providing a more uniform and controlled temperature and gas atmosphere will vary depending upon a number of factors including the composition, size and shape of the ceramic body, the loading of the ware into the ware space, the gas composition and flow rates, the kiln configuration, and the firing schedule utilized. As such, the pressure differential required in a particular firing atmosphere necessary to initiate the provide the more uniform and controlled temperature and gas atmosphere should be empirically determined for each ceramic ware/kiln system.

It should now be understood that the methods described herein may be used to provide a more uniform atmosphere in which to fire ware. The methods described herein also reduce the occurrence of cracks in the ware that can result from temperature and heating differentials. The methods described herein may increase production efficiencies by further reducing the amount of gas used to heat the ware due to more efficient heating of the ware.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for firing ware in a furnace, the method comprising:
   positioning at least one stack of ware in a ware space of a furnace, the stack of ware comprising a plurality of ware articles arranged such that at least laterally adjacent ware articles are spaced apart;
   heating the at least one stack of ware in the ware space of the furnace;
   introducing a first gas flow into the ware space on a first side of the at least one stack of ware as the stack is heated;
   introducing a second gas flow into the ware space on a second side of the at least one stack of ware as the stack is heated; and
   adjusting a flow condition of at least one of the first and second gas flows to create a pressure differential within the furnace across at least a portion of the ware space such that at least some of the first or second gas flows through the at least one stack of ware,
   wherein the first gas flow introduced on the first side of the stack has a first flow rate FR1, the second gas flow introduced on the second side of the stack has a second flow rate FR2, and FR1≠FR2.

2. The method of claim 1, wherein the plurality of ware articles are arranged such that at least vertically adjacent ware articles are spaced apart.

3. The method of claim 1, wherein at least one of the first and second gas flows is a secondary gas comprising one or more of: low oxygen gas, nitrogen, air, carbon dioxide, carbon monoxide, or water vapor.

4. The method of claim 1, wherein adjusting a flow condition comprises adjusting the first flow rate FR1 and the second flow rate FR2 to create the pressure differential across at least a portion of the ware space such that FR1 and FR2 have a percent flow rate differential of from about 10% to about 95%.

5. The method of claim 1, wherein the method further comprises exhausting the first or second gas flow from the furnace using at least one vent comprising a variable opening.

6. The method of claim 5, wherein adjusting a flow condition comprises adjusting the variable opening to create the pressure differential across at least a portion of the ware space.

7. The method of claim 1, wherein the furnace comprises a downdraft kiln, a microwave furnace, a gas-fired furnace, a radiative heating furnace, or an electric kiln.

8. The method of claim 1, wherein the first and second gas flows comprise the same gas.

9. The method of claim 1, wherein the first and second gas flows comprise different gases.

10. A method for firing ware in a kiln, the method comprising:
    positioning at least one stack of ware in a ware space of a kiln, the stack of ware comprising a plurality of ware articles arranged such that at least laterally adjacent ware articles are spaced apart;
    heating the at least one stack of ware in the ware space of the kiln;
    introducing a first gas into the ware space on a first side of the at least one stack of ware at a first flow rate FR1, and introducing a second gas on a second side of the at least one stack of ware as the stack is heated at a second flow rate FR2, as the stack is heated, wherein FR1≠FR2; and
    adjusting the first flow rate FR1 of the first gas to create a pressure differential across at least a portion of the at least one stack of ware such that at least some of the first gas flows laterally through the at least one stack of ware.

11. The method of claim 10, wherein the first flow rate FR1 and the second flow rate FR2 have a percent flow rate differential of from about 10% to about 95%.

12. The method of claim 10, wherein the method further comprises exhausting gas from the furnace using at least one vent comprising a variable opening.

13. The method of claim 10, wherein the kiln comprises a downdraft kiln, a microwave furnace, a gas-fired furnace, a radiative heating furnace, or an electric kiln.

14. A method for firing ware in a kiln, the method comprising:
    positioning at least one stack of ware in a ware space of a kiln, the stack of ware comprising a plurality of ware articles arranged such that at least laterally adjacent ware articles are spaced apart;
    heating the at least one stack of ware in the ware space of the kiln;
    introducing at least one gas into the ware space on a first side of the at least one stack of ware at a first flow rate FR1 as the stack is heated;
    introducing the at least one gas into the ware space on a second side of the at least one stack of ware at a second flow rate FR2 as the stack is heated; and
    adjusting the first flow rate FR1 to create a pressure differential across at least a portion of the at least one stack of ware such that at least some of the at least one gas flows through the at least one stack of ware.

15. The method of claim 14, wherein the method further comprises exhausting the first gas and second gas from the kiln using at least one vent comprising a variable opening.

16. The method of claim 14, wherein the kiln comprises a downdraft kiln, a microwave assisted kiln, or electric kiln.

\* \* \* \* \*